Patented Oct. 24, 1944

2,360,880

UNITED STATES PATENT OFFICE 2,360,880

PRODUCTION OF METHACRYLATES

Edward L. Kropa, Old Greenwich, Conn., assignor to American Cyanamid Company, New York, N. Y., a corporation of Maine No Drawing. Application January 15, 1943, Serial No. 472,481

2 Claims. (Cl. 260—486)

This invention relates to a method of producing esters of methacrylic acid from the corresponding esters of alpha-hydroxy isobutyric acid.

It has previously been proposed to dehydrate the esters or nitriles of acids containing an alpha-hydroxy group by first esterifying the hydroxy group with an acidic substance such as the anhydrides or chlorides of acetic acid, sulfurous acid, phthalic acid and the like, and then heating the esters at temperatures considerably above the boiling point of the esterifying acid. This method suffers from the disadvantage that considerable decomposition takes place at the elevated temperatures necessary for distillation of the acid.

A principal object of the present invention resides in the dehydration of esters of alpha-hydroxy isobutyric acid by heating them with relatively non-acidic compounds such as benzotrichloride and similar compounds containing a labile carbon-chlorine linkage. Although these compounds are non-acidic at room temperatures, I have discovered that they are capable of entering into a loose chemical combination with esters of alpha-hydroxy isobutyric acid at elevated temperatures, and that they will function as dehydrating agents for the conversion of these esters into the corresponding esters of methacrylic acid.

By employing benzotrichloride and similar compounds containing labile carbon-chlorine linkages I have found that the dehydration of esters of alpha-hydroxy isobutyric acid can be carried out at greatly reduced temperatures, as compared with those that must be employed when strong acids are used as dehydrating agents. Thus, for example, ethyl, methyl and other lower alkyl methacrylates have been obtained by heating the corresponding esters with benzotrichloride at temperatures of 100–200° C., and good yields of these products have been obtained by heating at 130–160° C. for periods of time of the order of 5–10 minutes. Under these reaction conditions there is practically no thermal decomposition or deterioration of the methacrylic acid esters, and a product of good purity is therefore obtained.

In practicing the process of my invention it is preferable to use about 1 molecular quantity of benzotrichloride for each 2–3 moles of alpha-hydroxy isobutyrate, although larger quantities of the dehydrating agent may of course be employed if desired. Any suitable ester of alpha-hydroxy isobutyric acid may be dehydrated by this method including esters of aromatic alcohols such as benzyl alcohol, cycloaliphatic alcohols such as cyclohexanol and lower or higher aliphatic alcohols. However, I prefer to employ the esters of the lower aliphatic alcohols such as methanol, ethanol and butanol, since the corresponding methacrylate esters are of greater utility in the manufacture of plastics. The process is carried out simply by heating the ester with the dehydrating agent for a short time after which the methacrylate is recovered by distilling the reaction mixture at atmospheric or reduced pressures or by extraction with suitable solvents.

The invention will be illustrated by the following specific example to which, however, it is not limited.

*Example*

264 parts by weight of ethyl alpha-hydroxy isobutyrate were placed in a flask fitted with a stirrer and a distillation head and heated. 106.5 parts of benzotrichloride were slowly added after which the reaction mixture was heated at 140–150° C. for an additional 5 minutes. Upon distillation at 102–110° C. there were obtained 220 parts by weight of crude ethyl methacrylate which was purified by washing with sodium chloride solution, neutralizing with sodium bicarbonate and drying with anhydrous sodium sulfate.

What I claim is:

1. A method of producing a lower alkyl ester of methacrylic acid which comprises heating the corresponding ester of alpha-hydroxy isobutyric acid with benzotrichloride.

2. A method of producing ethyl methacrylate which comprises heating ethyl alpha-hydroxy isobutyrate with benzotrichloride.

EDWARD L. KROPA.